United States Patent Office 2,901,929
Patented Sept. 1, 1959

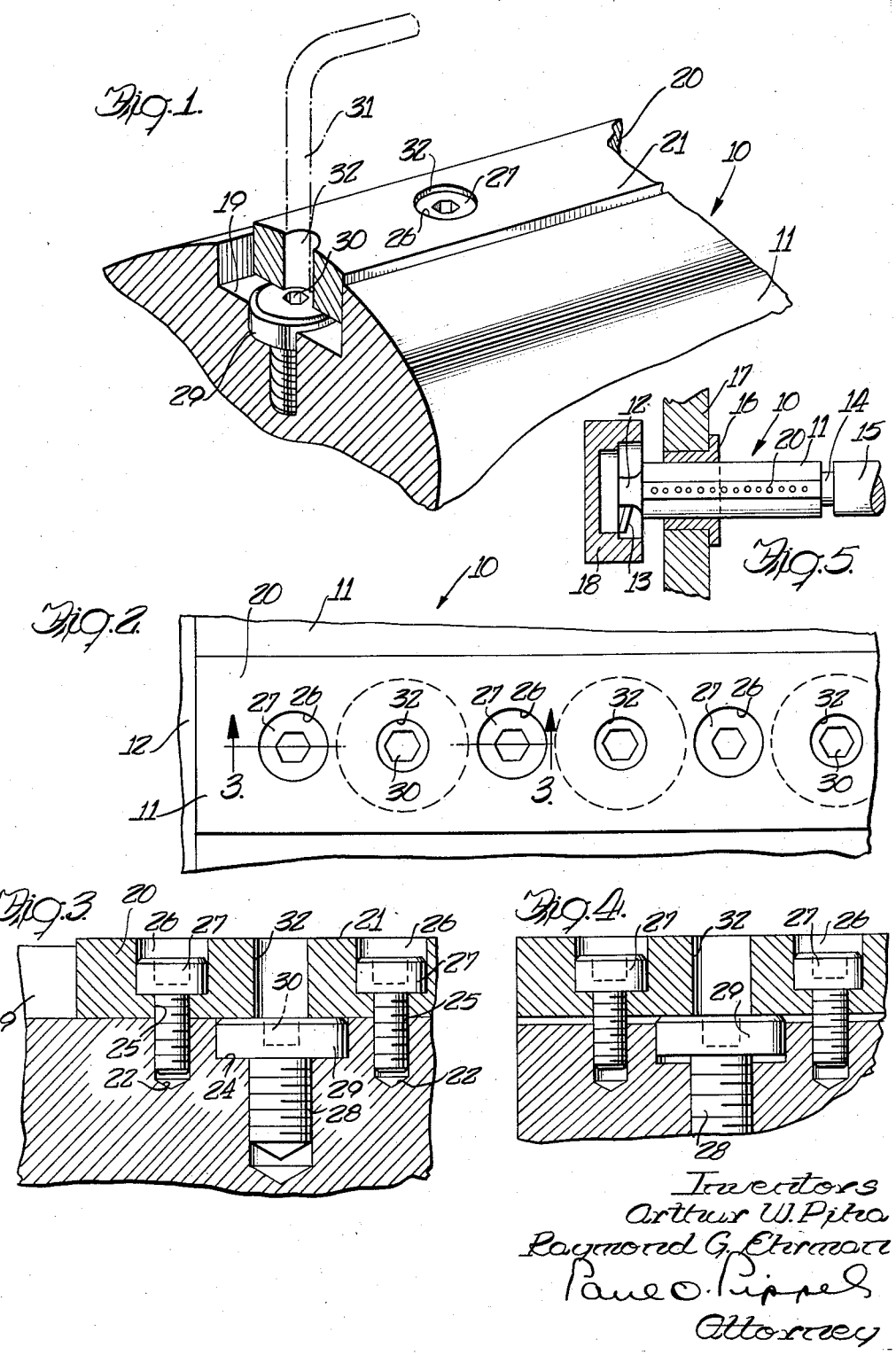

2,901,929

ADJUSTABLE WEAR STRIPS FOR BORING BARS

Arthur W. Piha, Riverside, and Raymond G. Ehrman, Broadview, Ill.

Application June 13, 1957, Serial No. 665,485

8 Claims. (Cl. 77—58)

This invention relates to an improvement in boring bars and more specifically relates to pilot means for a boring bar having a plurality of adjustable wear strips.

Boring bars, which are also referred to as pilot bars, are well known in the machine tool industry. Such bars are common in metal removing operations and primarily consist of an elongated cylindrical body to which is attached, at one end, a cutting tool. The other end of the bar is provided with a shank which is placed into locking relation with respect to a reciprocating spindle of a machine tool. The boring bars are generally supported by means of a fixture which contains a cylindrical bushing or sleeve and the bar is disposed within the sleeve in a reciprocal fashion, the tool being forced into cutting engagement with a work piece. Bars of this type are very quickly subject to wear as they are reciprocated within the sleeve. In order to properly support the tool and to reduce the wear on the bar, it is customary to provide on the bar a plurality of wear strips which extend longitudinally with the bar and are circumferentially spaced, these wear strips being replaceable and consisting generally of a much harder steel or bronze than the main body of the bar. Despite the durability of the wear strips, it is frequently necessary to adjust the height of the wear strips as wear on the strips occurs. The conventional manner in which this is accomplished is to place shims underneath the wear strips within the recesses. This, of course, necessitates the complete removal of the wear strips each time such adjustment is necessary during use. Such adjustment of the wear strips therefor is time consuming and it is a prime object of this invention to provide an improved boring or pilot bar having adjustable wear strips which may be adjusted without the need of removing the wear strips from the recesses in which they are disposed.

It is still another object of this invention to provide an improved boring bar having a plurality of wear strips which may be readily adjusted while the wear strips are in position on the bar, the adjustment being such that considerable accuracy can be achieved in setting the bars for pilot grinding.

A still further object is to provide an improved adjustable wear strip assembly for boring bars, the assembly including a plurality of adjustable devices which are longitudinally spaced along the wear strips, the said wear strips including openings in registry with the adjustable devices whereby height adjustment of the wear strips may be made without the need of removing the wear strips to procure such adjustment.

These and other objects will become more readily apparent form a reading of the description when examined in connection with the accompanying sheet of drawing.

In the drawings:

Figure 1 is a perspective view of a portion of a boring bar showing an adjustable wear strip adjustably positioned on the said bar;

Figure 2 is an enlarged plan view of a boring bar showing an adjustable wear strip;

Figure 3 is an enlarged sectional view taken substantially along the line 3—3 of Figure 2;

Figure 4 is a view similar to Figure 3 showing an adjustable wear strip in an adjusted position; and Figure 5 is a view showing a workpiece being bored by a boring bar with an adjustable wear strip.

Referring now to Figures 1 and 5, a pilot or boring bar is generally designated by the reference character 10. The pilot bar 10 consists of an elongated cylindrical pilot body 11 having a reduced head portion 12 on which a cutting tool or bit 13 may be suitably secured. The other end of the body 11 is provided with a shank 14 which is secured within a spindle 15 of a suitable machine tool (not shown). A bushing or sleeve 16 is secured to a fixture 17 which may be suitably supported on the machine tool. The fixture 17 is positioned in working relation with respect to a work piece 18 and the cylindrical body 11 is adapted to be moved toward and away from the work piece 18 which is normally rotated by a suitable work holder (not shown). As the work piece 18 is positioned the pilot bar 10 rotates and is moved toward the work piece 18, the cutting tool 13 suitably removes material.

The cylindrical body is provided with a plurality of U-shaped recesses. These recesses extend in circumferentially spaced relation around the body 11 and each recess has disposed therein a wear strip 20. The wear strip 20 is generally made of a very hard steel material Stellite or bronze having unusual wear properties. The wear strips 20 project outwardly from the surface of the body 11 and suitably support the bar within the sleeve 16. Only one wear strip has been shown, but it is understood that a plurality of these strips are disposed about the peripheral surface of the body. Each wear strip is provided with an arcuate outer surface 21, the surfaces of the wear strips conforming to the inner diameter of the sleeve 16.

As best shown in Figures 3 and 4, the body 11 is provided with a plurality of longitudinally spaced threaded bores 22 and a plurality of larger threaded bores 32, the latter being spaced between the bores 22. Each bore 32 also includes an annular enlargement 24 opening outwardly at the bottom of each recess 19. Each wear srtip is also provided with a plurality of bores 25 in registry with the bores 22. The upper ends of the bores 25 are each in registry with a countersink recess 26 provided in the wear strip. A plurality of socket screws 27 extend through the bores 25 and are threaded into the bores 22 for securely fastening the wear strips 20 within the recesses 19. An adjusting screw 28 is threaded into each bore 32, the said screw 28 including an enlarged head 29 which is normally disposed in the enlargement 24. Each head 29 has its upper surface in engagement with the underneath side of the wear strip 21. Each enlarged head also includes a suitable wrench engaging means in the form of a socket 30 which may be suitably engaged by a wrench as indicated in Figure 1. In order to provide for access to each socket 30, each wear strip 20 is provided with a plurality of openings 32 which are in registry with the sockets 30.

In continued use, the arcuate surfaces of the wear strips 20 become worn and thus misalignment of the cutting tool 13 may occur or too much clearance may be had between the boring bar and the sleeve 16. As the wear strips thus become worn, the boring bar 10 is removed from the machine tool and the screws 27 are loosened. The wear strips 20 may now be adjusted outwardly so that they will again conform closely to the inner diameter of the sleeve 16. In order to effectuate such accurate adjustment, a wrench 31 is inserted through each of the openings 32 and into engagement with each socket 30 of each screw 28. The screw then is turned the desired number of times and the wear strips 20 are thus moved outwardly and are solidly supported upon each of the heads 29. After the wear strips 20 have thus been moved to the desired position, the screws 27 are again tightened so that the wear strips are firmly disposed on top of the screws 28. The arcuate surface 21 of each bar is then ground to the desired curvature and the bar is then again placed in position on the sleeve 16 for further operation.

Thus it can be seen that the wear strips 20 are easily and quickly adjusted after they become worn without the necessity of removing the wear strips in order to insert shims. Thus a great deal of time is saved and accuracy is obtained which is not possible with the shim type of adjustment.

It can be seen now that the objects of the invention have been fully achieved and it must be understood that changes and modifications may be made without departing from the spirit of the invention as disclosed nor the scope thereof as defined in the appended claims.

What is claimed is:

1. A pilot bar adapted to be supported for reciprocation within a sleeve, and adapted to support a cutting tool, comprising an elongated cylindrical body, said elongated body including a plurality of circumferentially spaced longitudinally extending U-shaped recesses, a wear strip in each recess conforming generally to the shape of said recess, said wear strips each including an outer arcuate surface projecting outwardly from the bar, said arcuate surfaces conforming generally to the inner wall of a sleeve on which said bar is supported, said body including a plurality of open end first threaded bores disposed below said wear strips and being longitudinally disposed along said recesses, said body also including a plurality of second threaded bores, said second threaded bores being disposed between and in longitudinally spaced relation with respect to said first bores, each said second bore having at its outer end an annular enlargement, each wear strip having a plurality of third bores and a plurality of countersink bores in registry with said first bores, a threaded securing member in each countersink bore and third bore and engaging said first bore to connect said wear strips to said body, and means adapted to move and support said wear strips outwardly from the axis of the bar comprising a plurality of second threaded members engaging said second bores, said second threaded members each having an enlarged head disposed in the enlargement of each second bore, each said head including an upper surface engaging the underneath side of each wear strip, and a socket disposed in said surface, each wear strip having a plurality of openings registering with the sockets whereby a socket tool may be inserted through said openings for engaging said sockets.

2. A pilot bar adapted to be supported for reciprocation within a sleeve, and adapted to support a cutting tool, comprising an elongated cylindrical body, said elongated body including a plurality of circumferentially spaced longitudinally extending U-shaped recesses, a wear strip in each recess conforming generally to the shape of said recess, said wear strips each including an outer arcuate surface projecting outwardly from the bar, said arcuate surfaces conforming generally to the inner wall of a sleeve on which said bar is supported, said body including a plurality of open end first threaded bores disposed below said wear strips and being longitudinally disposed along said recesses, said body also including a plurality of second threaded bores, said second threaded bores being disposed between and in longitudinally spaced relation with respect to said first bores, each said second bore having at its outer end an annular enlargement, each wear strip having a plurality of third bores in registry with said first bores, a threaded securing member recessed in each third bore and engaging said first bores to connect said wear strips to said body, and means adapted to move and support said wear strips outwardly from the axis of the bar comprising a plurality of second threaded members engaging said second bores, said second threaded members each having an enlarged head disposed in the enlargement of each second bore, each of said heads including an upper surface engaging the underneath side of each wear strip, and a socket disposed in said surface, each wear strip having a plurality of openings registering with the sockets whereby a socket tool may be inserted through said openings for engaging said sockets.

3. A pilot bar adapted to be supported for reciprocation within a sleeve, and adapted to support a cutting tool, comprising an elongated cylindrical body, said elongated body including a plurality of circumferentially spaced longitudinally extending U-shaped recesses, a wear strip in each recess conforming generally to the shape of said recess, said wear strips each including an outer arcuate surface projecting outwardly from the bar, said arcuate surfaces conforming generally to the inner wall of a sleeve on which said bar is supported, said body including a plurality of open end first threaded bores disposed below said wear strips and being longitudinally disposed along said recesses, said body also including a plurality of second threaded bores, said second threaded bores being disposed between and in longitudinally spaced relation with respect to said first bores, each said second bore having at its outer end an annular enlargement, each wear strip having a plurality of third bores in registry with said first bores, a threaded securing member recessed in each third bore and engaging said first bores to connect said wear strips to said body, and means adapted to move and support said wear strips outwardly from the axis of the bar comprising a plurality of second threaded members engaging said second bores, said second threaded members each having an enlarged head disposed in the enlargement of each second bore, each of said heads including an upper surface engaging the underneath side of each wear strip, and a wrench engageable means disposed in said surface, each wear strip having a plurality of openings registering with the wrench engageable means whereby a wrench may be inserted through said openings for engaging said wrench engaging means.

4. A pilot bar adapted to be supported for reciprocation within a sleeve, and adapted to support a cutting tool, comprising an elongated cylindrical body, said elongated body including a plurality of circumferentially spaced longitudinally extending recesses, a wear strip in each recess, said wear strips each including an outer surface projecting outwardly from the bar for engaging the inner wall of a sleeve on which said bar is supported, said body including a plurality of open end first threaded bores disposed below said wear strips and being longitudinally disposed along said recesses, said body also including a plurality of second threaded bores, said second threaded bores being disposed between and in longitudinally spaced relation with respect to said first bores, each said second bore having at its outer end an annular enlargement, each wear strip having a plurality of third bores in registry with said first bores, a threaded securing member recessed in each third bore and engaging said first bores to connect said wear strips to said body, and means adapted to move and support said wear strips outwardly from the axis of the bar comprising a plurality of second threaded members engaging said second bores, said second threaded members each having an enlarged head disposed in the enlargement of each second bore, each of said heads including an upper surface engaging the underneath side of each wear strip, and a tool engaging means disposed on said surface, each wear strip having a plurality of openings registering with the tool engaging means whereby a tool may be inserted through said openings for engaging said tool engaging means.

5. A pilot bar adapted to be supported for reciprocation and adapted to support a cutting tool, comprising an elongated cylindrical body, said elongated body including a plurality of circumferentially spaced longitudinally extending recesses, a wear strip in each recess, said wear strips each including an outer surface projecting outwardly from the bar, said body including a plurality of open end first threaded bores disposed below said wear strips and being longitudinally disposed along said recesses, said body also including a plurality of second threaded bores, said second threaded bores being disposed in longitudinally spaced relation with respect to said first bores, each said second bore having at its outer end an annular enlargement, each wear strip having a plurality of third bores in registry with said first bores, a threaded securing member in each third bore engaging said first bore to connect said wear strips to said body, and means adapted to move and support said wear strips outwardly from the axis of the bar comprising a plurality of second threaded members engaging said second bores, said second threaded members each having an enlarged head disposed in the enlargement of each second bore, each of said heads including an upper surface engaging the underneath side of each wear strip, each wear strip having a plurality of openings registering with the enlarged heads whereby a tool may be inserted through said openings for engaging said heads for turning said second threaded members.

6. A pilot bar adapted to be supported in a hollow member and adapted to support a tool comprising an elongated body having a plurality of peripherally spaced longitudinal recesses, a plurality of wear strips disposed in said recesses, a plurality of connecter elements connecting said wear strips to said body within said recesses, said body including a plurality of threaded bores having annular enlargements opening into said recesses, and means for adjustably positioning said wear strips outwardly with respect to the axis of said bar whereby outer surfaces of said wear strips project outwardly from said bar comprising a threaded member disposed in each said bores, said threaded members each having an enlarged head disposed in each enlargement and adapted to support the underneath surfaces of said wear strips, and a tool engageable means on each head, said wear strips including a plurality of openings, each opening registering with said tool engageable means whereby a tool may be inserted into each opening for adjusting said threaded members.

7. A pilot bar adapted to be supported in a hollow member and adapted to support a tool comprising an elongated body having a plurality of peripherally spaced longitudinal recesses, a plurality of wear strips disposed in said recesses, means connecting said wear strips to said body within said recesses, said body including a plurality of threaded bores having annular enlargements opening into said recesses, and means for adjustably positioning said wear strips outwardly with respect to the axis of said bar whereby outer surfaces of said wear strips project outwardly from said bar, comprising a threaded member disposed in each said bores, said threaded members each having an enlarged head disposed in each enlargement and adapted to support the underneath surfaces of said wear strips, and a tool engageable means on each head, said wear strips including a plurality of openings, each opening registering with said tool engageable means whereby a tool may be inserted into each opening for adjusting said threaded members.

8. A pilot bar adapted to be supported in a hollow member and adapted to support a tool comprising an elongated body having a plurality of peripherally spaced longitudinal recesses, a plurality of wear strips disposed in said recesses, means connecting said wear strips to said body within said recesses, said body including a plurality of threaded bores opening into said recesses, and means for adjustably positioning said wear strips outwardly with respect to the axis of said bar whereby outer surfaces of said wear strips project outwardly from said bar, comprising a threaded member disposed in each said bores, said threaded members each having a head and being disposed beneath said wear strips and engaging the underneath surfaces of said wear strips to adjustably support the same and a tool engageable means on each head, said wear strips including a plurality of openings, each opening registering with said tool engageable means whereby a tool may be inserted into said opening and into engagement with said tool engageable means for adjusting said threaded members.

References Cited in the file of this patent

UNITED STATES PATENTS

| | | |
|---|---|---|
| 1,644,197 | Marty | Oct. 4, 1927 |
| 1,698,861 | Wadell | Jan. 15, 1929 |